United States Patent [19]

Khandkar

[11] Patent Number: 5,340,665
[45] Date of Patent: Aug. 23, 1994

[54] CREEP RESISTANT, METAL-COATED LIFEO$_2$ ANODES FOR MOLTEN CARBONATED FUEL CELLS

[75] Inventor: Ashok C. Khandkar, Salt Lake City, Utah

[73] Assignee: Ceramatec, Inc., Salt Lake City, Utah

[21] Appl. No.: 940,031

[22] Filed: Sep. 3, 1992

[51] Int. Cl.$^5$ ............................................. H01M 4/86
[52] U.S. Cl. ......................................... 429/40; 429/44; 429/16
[58] Field of Search ............................... 429/40, 44, 16

[56] References Cited

U.S. PATENT DOCUMENTS

| | | | |
|---|---|---|---|
| 4,317,866 | 3/1982 | Trocciola et al. | 429/16 |
| 4,361,631 | 11/1982 | Iacovangelo et al. | 429/40 |
| 4,404,267 | 9/1983 | Iacovangelo et al. | 429/45 |
| 4,423,122 | 12/1983 | Iacovangelo et al. | 429/45 |
| 4,643,955 | 2/1987 | Smith et al. | 429/41 |
| 4,895,774 | 1/1990 | Ohzu et al. | 429/16 |
| 4,980,248 | 12/1990 | Fujita | 429/41 |
| 4,992,342 | 2/1991 | Singh et al. | 429/41 |
| 5,206,095 | 4/1993 | Donado et al. | 429/40 |

OTHER PUBLICATIONS

Suzuki et al. Chem. Abst. 118-42219p (1992).
Akyama et al. Chem. Abst. 117-254936z (1992).
Yamanaka et al. Chem. Abst. 117-237237e (1992).
Muneuchi et al. Chem. Abst. 116-17775g (1991).
Ito et al. Chem. Abst. 115-211872s (1991).
Eck, Chem. Abst. 114-169390k (1990).
Nishihara, Chem. Abst. 111-100320h (1989).
Hado et al. Chem. Abst. 111-100310e (1989).
Urushibata, Chem. Abst. 110-216270a (1988).
Koseki, Chem. Abst. 110-176688j (1988).
Hotta et al. Chem. Abst. 110-98840m (1988).
Niikura et al. Chem. Abst. 110-98767t (1989).
Takashima et al. Chem. Abst. 109-213512z (1988).

*Primary Examiner*—Cecilia Tsang
*Attorney, Agent, or Firm*—Trask, Britt & Rossa

[57] ABSTRACT

A porous, creep-resistant, metal-coated, LiFeO$_2$ ceramic electrode for fuel cells is disclosed. The electrode is particularly useful for molten carbonate fuel cells (MCFC) although it may have utilities in solid oxide fuel cells (SOFC) as well.

14 Claims, 8 Drawing Sheets

CREEP RESISTANT, METAL-COATED LIFEO₂ ANODES FOR MOLTEN CARBONATED FUEL CELLS

BACKGROUND OF THE INVENTION

This invention was made with Government support under DOE Contract No. DE-AC21-85MC22194 awarded by the Department of Energy, Morgantown Energy Technology Center. The Government has certain rights in this invention.

FIELD:

This invention relates to anodes for molten carbonate fuel cells.

STATE OF THE ART

The use of porous nickel sintered plaques as electrodes in molten carbonate fuel cells has been widespread. In general, these electrodes are high performance electrodes, but suffer from two pivotal problems. First of all, is the high cost of nickel and, secondly, these electrodes continue to sinter with time resulting in a loss of surface area and creep, resulting in altered dimensions, altering of pore size distribution in the plaque and concomitant loss of performance over the 50,000 hour required life of an operating cell.

At the anode, hydrogen in the fuel gas reacts with carbonate ions from the electrolyte to form water and carbon dioxide:

At the cathode, oxygen and carbon dioxide react to form carbonate via the overall reaction:

State-of-the-art molten carbonate fuel cell anodes are porous plaques prepared by sintering a physical mixture of metallic nickel and a variety of stabilizing additives in a reducing atmosphere at about 1000° C. The anode provides reaction sites for electrochemical oxidation of hydrogen in the fuel which is enhanced by increased surface area, good electronic conductivity and sufficient wetting by the carbonate electrolyte. Additional functions of the anode include: reservoir for carbonate storage required to replenish that being lost from the cell package; catalyst for the reforming and water gas shift reaction of the fuel; and as a bubble pressure barrier to prevent intermixing of fuel and oxidant if flaws develop in the electrolyte matrix. For all these functions, the pore structure and the wetting characteristics of the anode are important; and, since the fuel cell is required to endure 40,000 hours of operation, the stability of these properties must be assured.

Current Ni+2% to 10% Cr anodes have porosities of 60% to 70% and a mean pore size of 3 to 6 μm. As described earlier, the added chromium is converted during cell operation to $LiCrO_2$ which consumes carbonate and causes morphological changes in the electrode. These morphological changes of the anode cause shifts in the carbonate inventory of both the electrolyte matrix and the cathode which results in cell performance changes. In addition, this restructuring of the porous anode facilitates unwanted creep of the anode due to the applied holding forces used to maintain good cell contact and adequate gas sealing around the cell perimeter.

Metal-coated ceramic anodes for molten carbonate fuel cells have shown superior creep resistance and therefore have great potential for long life, stable, economical anodes. A major problem with the choice of the metal/ceramic substrate compositions is the wetting problem, leaving a weak anode.

An electroless metal plating process as described in U.S. Pat. Nos. 4,361,631; 4,404,267 and 4,423,122 of Iacovangelo et al., assigned to General Electric was found to result in non-uniform and incomplete metal coverage, especially on $LiAlO_2$ substrates. Anodes fabricated from metal coated powders were found to have inadequate strength. The main problems related to the development of metal coated ceramic anodes were shown to be related to dewetting of the metal at elevated temperatures of anode fabrication. Metal coated $SrTiO_3$ powders were fabricated into anodes by a process identical to that reported in the GE patents. Microstructural examination revealed that the grains of the ceramic had fused together, with the metal having dewetted from the surface of the ceramic.

Another problem related to the Cr-stabilized Ni anode is that during cell operation, the Cr undergoes corrosion to form $LiCrO_2$ through reaction with the $Li_2CO_3$-$K_2CO_3$ (62-38 mol ratio) electrolyte. The metal-coated ceramic substrate anodes are expected to offer substantial advantages over the current Ni(Cr) anodes.

SUMMARY OF THE INVENTION

A creep-resistant, metal-coated, $LiFeO_2$ ceramic electrode for molten carbonate fuel cells (MCFC) has been developed.

A $LiFeO_2$ powder substrate, when coated with metal, especially nickel and nickel alloys, and sintered to form a porous anode, forms a creep resistant anode which does not exhibit significant dewetting problems. The metal coating adheres well to the ceramic powder and forms a continuous conduction path. The average creep of such anodes is ~2.5–3%, which is significantly better than state-of-the-art Ni(Cr) anodes. Conceptually, by utilizing a significant volume of a low-cost ceramic substrate, problems related to sintering and morphological changes due to creep can be greatly reduced. Moreover, the absence of Cr as a stabilizer is expected to reduce corrosion/lithiation, thus allowing stable long-term performance. Cu/Ni-coated (50:50 mol ratio, 50 w/o metal loading) $LiFeO_2$ anodes were optimized to meet MCFC anode specifications.

Creep testing of the metal coated ceramic anodes was conducted. From the creep results it was determined that the predominant creep mechanism is due to particle rearrangement. The anode porosity and mean pore size had significant effect on the creep of the anode. Lower porosity and pore size consistent with performance criteria are desired to reduce creep. Lower metal loading with uniformity of coverage will result in lower creep behavior of the anode. Of the substrates evaluated, $LiFeO_2$ in general exhibited lower creep which was attributed to superior metal adhesion. Such Ni metal coated $LiFeO_2$ anodes can be also used as anodes for low temperature solid oxide fuel cells (SOFCs).

Figure 1:
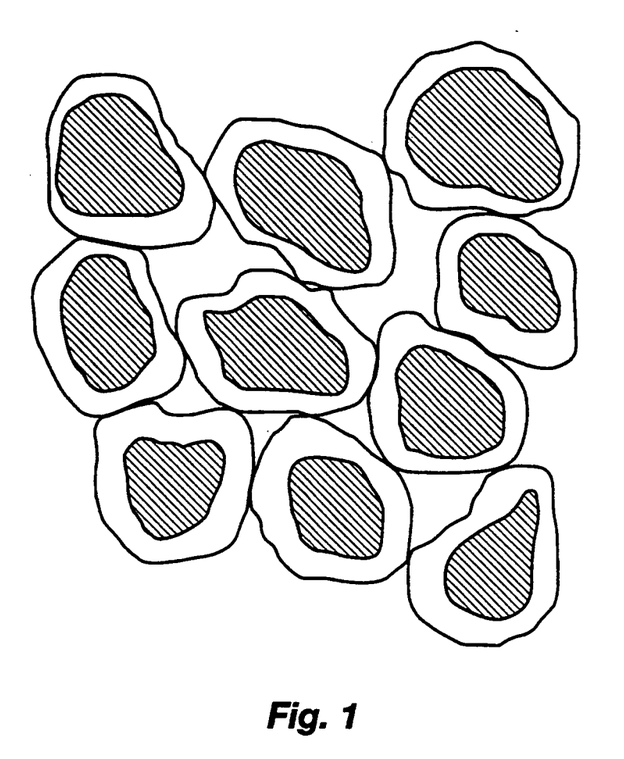
FIG. 1 is a schematic representation of metal coated ceramic particles.

A critical requirement of such anodes is that the metal (Ni or Ni-Cu alloys) form a continuous film over the ceramic powder substrates thus allowing continuous electronic conduction paths. FIG. 1 shows schematically the ideal metal coated ceramic anode morphology.

The thin metal layer on the ceramic particles is expected to show substantially increased creep resistance. Further advantages of this approach are that anode morphology can be better controlled by controlling the size of the ceramic (substrate) powder and the metal coating thickness. In addition, substantial cost reductions are also expected by using reduced amounts of metal and low cost ceramic substrates.

Suitable anode materials were prepared by coating by electroless deposition techniques 50 Ni/50 Cu on a conductive ceramic ($LiFeO_2$) substrate.

DETAILED DESCRIPTION OF THE INVENTION

A large batch of $LiFeO_2$ was synthesized. The powder was determined to be phase pure using XRD, and the particle size distribution and BET surface area were characterized. The powder was milled to get a mean particle size centered around 15 $\mu$m. The metal wetting characteristics were found to be favorable as compared to $LiAlO_2$. An electroless Ni and Cu plating process was developed and the optimal conditions were determined. The metal coating appeared to be uniform as determined by SEM/EDXS. In a separate study, the phase stability of $LiFeO_2$ in a molten carbonate melt was determined.

Figure 2:
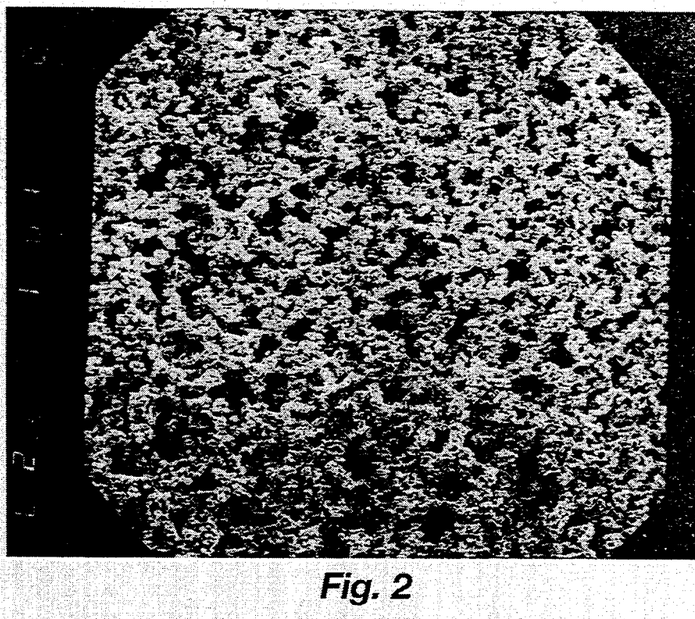
FIGS. 2 and 3 are photomicrographs of sintered Cu/Ni on $LiFeO_2$.
Figure 3:
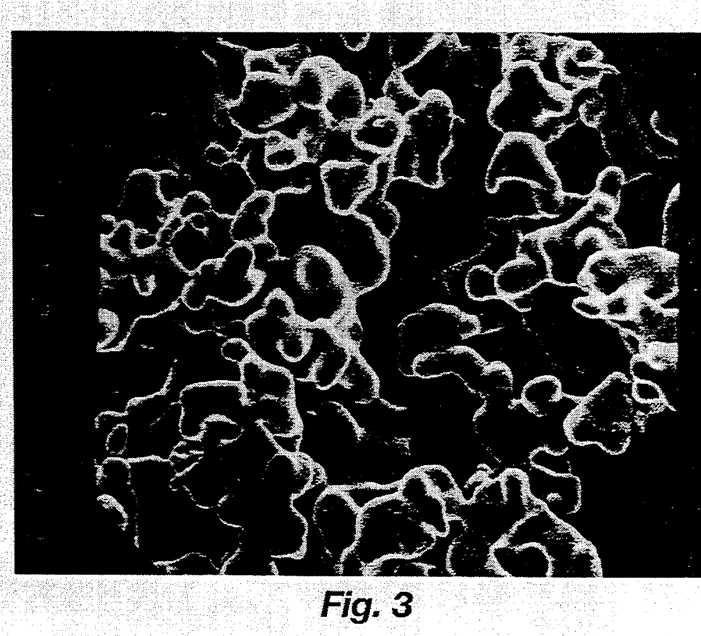

Anodes were fabricated from $LiFeO_2$ particles with Ni, Cu or Ni/Cu alloys. The sintered anodes exhibited good mechanical properties. SEM examination of the microstructure revealed good coating of the particles with well formed necks thus confirming the observed strength of sintered anodes. Typical microstructures are shown in FIG. 2 and 3. After several fabrication trials, it was determined that moderate pressure during sintering improved the strength of the porous anode plaques. The porosity of the sintered plaques was varied by varying the compaction pressure.

There was much scatter to the results. Of all the tests, the Ni-Cr electrodes showed the least creep. The creep ranged from a low of 0.65% to a high of 6.18% and were the most consistent. The $LiAlO_2$ electrodes creep values ranged from a low of 0.96% to a high of 20.23%. The $LiFeO_2$ electrodes had the most scatter and creep ranged from a low of 1.46% to a high of 33.93. Summarizing the results for metal coated $LiFeO_2$ powder, with approximately 37% metal loading and 45% porosity an average of 4 samples indicate a creep of 3.6% at 650° C.; 100 psi. This is an improvement over state of the art materials.

| Test No. | Metal Loading | PPS | Porosity | % Creep | Powder | # of Samples |
|---|---|---|---|---|---|---|
| | $LiFeO_2$ at 650° C. and 100 psi | | | | | |
| 2.3.1b-10 | 50.49 | 9.0 | 27.63 | 7.11 | LF-18 | 6 |
| 2.3.1b-05 | 37.0 | 6.0 | 48.7 | 4.31 | LF-10 | 3 |
| 2.3.1b-05 | 37.0 | 6.0 | 43.42 | 1.45 | LF-10 | 2 |
| 2.3.1b-06 | 37.0 | 6.0 | 44.10 | 2.55 | LF-10 | 1 |
| 2.3.1b-06 | 46.5 | 6.0 | 43.8 | 6.31 | LF-9 | 1 |
| 2.3.1b-11 | 43.33 | N/A | 40.97 | 32.12 | LF-19 | 2 |
| 2.3.1b-11 | 66.0 | N/A | 43.07 | 32.20 | LF-16 | 5 |

Figure 4:
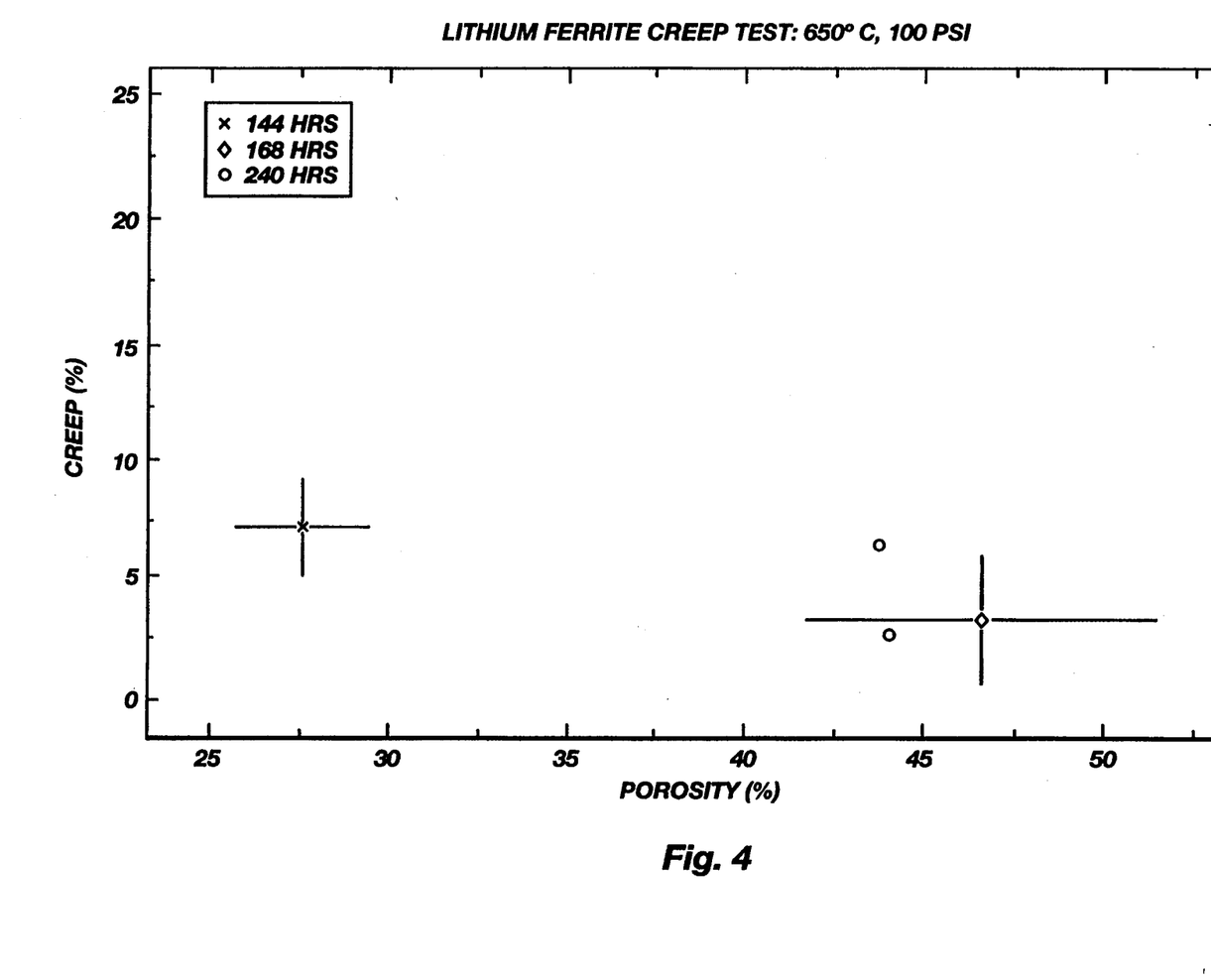
FIGS. 4 and 5 are graphs which show creep behavior of metal.
Figure 5:
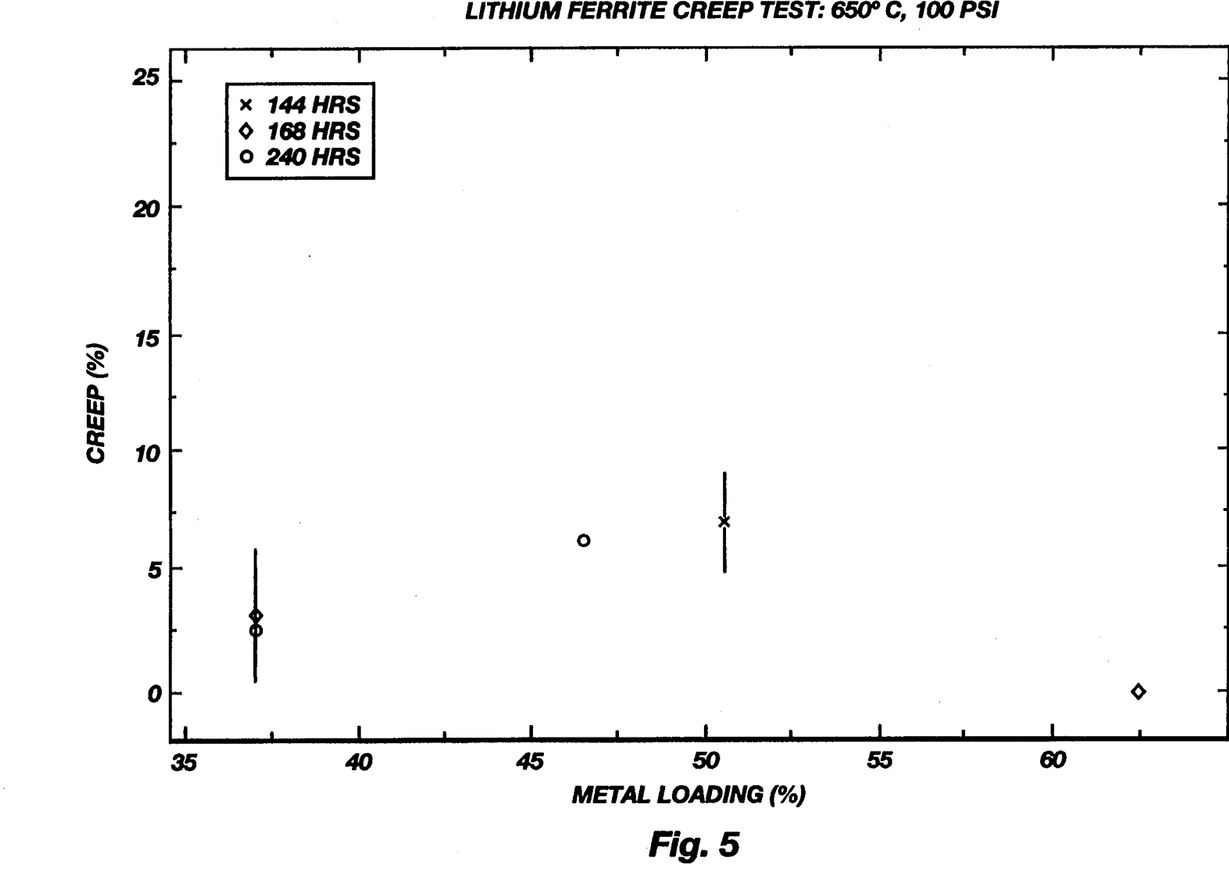

The metal wetting characteristics of $LiFeO_2$ anode are more favorable. Thus, a better bond is to be expected between the metal and the ceramic, thereby reducing the amount of primary creep. FIGS. 4 and 5 show the general trends in the creep behavior of metal-coated $LiFeO_2$ anodes. Creep is relatively insensitive to both metal loading and anode porosity, indicative that once particle rearrangement occurs secondary creep mechanisms dominate the creep behavior. Creep characteristics are shown for Test #-5. The data show that a magnitude of the primary creep is less than $\sim$2%. Further creep is as expected for diffusion driven process. Higher anode creep is exhibited for anodes with higher means pore size and porosity. This is consistent with observations for $LiAlO_2$ anodes. However, the overall creep characteristics are superior for metal coated $LiFeO_2$ and it exhibits the potential for a viable alternate anode material.

Metal-coated $LiFeO_2$ anodes show great potential as a creep resistant anode. Further improvements in both metal adhesion as well as anode morphology are anticipated which could lead to reduced primary creep and thus enhance creep resistance. These anodes generally meet the functions of the molten carbonate fuel cell anode which are:

Provide reaction sites for electrochemical oxidation of the fuel gas

Act as fuel reforming catalyst

Serve as reservoir for storage of electrolyte for carbonate management of the cell package Act as a bubble pressure barrier when fabricated as a dual porosity structure.

To perform these functions, the anode must have:

High exchange current density

Good electrocatalytic activity

Good electrical conductivity

Low oxidation potential

Good wetting characteristics to hold carbonate

High catalytic activity towards fuel reforming reactions

Appropriate porosity and pore size distribution

Good mechanical strength

Sufficient thickness to store the carbonate requirements of life.

TABLE 3

| ANODE STRUCTURE TRADEOFFS | |
|---|---|
| Goal | Desired Structure |
| Strength and Dimensional Stability | 1. Low Porosity<br>2. Small Pores |
| Low Polarization | 1. Large Pores for Fuel Access<br>2. Large Surface Area → Small Particles |
| Carbonate Reservoir | 1. Some Pores Larger than Electrolyte Matrix Pores<br>2. Thick layer<br>3. High Porosity |

TABLE 3-continued

ANODE STRUCTURE TRADEOFFS

| Goal | Desired Structure |
|---|---|
| | 4. Large Population of Small Pores |
| Reforming Catalyst | 1. Large Surface Area |

Clearly, the optimum anode structure with respect to a specified electrolyte and cathode structures must be determined on a "case-by-case" basis for each candidate anode type/structure. The metal coated $LiFeO_2$ anode materials possess, generally, the desired characteristics for good anode materials.

$LiFeO_2$ Synthesis $LiFeO_2$ powder was synthesized using the following procedure: $Li_2CO_3$ and $Fe_3O_4$ were mixed in stoichiometric proportions and ball milled for 12–14 hours in ethanol. The mixture was then dried and calcined in a crucible in air at 1200° C. for 10 hours. The resulting agglomerated powder was ball milled for 2 hours and recalcined at 1200° C. for 10 hours to insure complete reaction and homogeneity. The synthesized powder was characterized by XRD to confirm the $LiFeO_2$ phase.

Among the two large (~1 kg) batches of $LiFeO_2$ synthesized the first batch was found to be a mixture of alpha-$LiFeO_2$ and alpha $LiFe_5O_8$; the Li deficient phase, alpha-$LiFe_5O_8$, results from a loss of lithia during calcination/reactive-sintering cycles during synthesis. The second batch was synthesized in an effort to achieve a single phase of $LiFeO_2$. During the sintering cycles some $Li_2CO_3$ was sprinkled on top of the powder to maintain a high Li activity over the powder mass, in order to avoid the loss of lithia. The top layer of the powder was discarded and the rest of the powder was milled to break up agglomerates and then characterized by XRD. This powder was characterized to be single phase alpha-$LiFeO_2$.

Sintering Trials on Cu/Ni Coated $LiFeO_2$

The past efforts were centered principally on pressureless sintering of metal coating ceramic powders and prepressing at various pressures followed by pressureless sintering. SEM examination of the sintered anodes showed that while the particles were of the approximate size range compatible with achieving the desired anode specifications, the packing of the particles was not optimal. A "honeycomb" type structure was formed due to interparticle necking of the metal deposits. This resulted in large agglomerates with large open pores.

Efforts were centered around adding binders to the metal coating ceramic powders and prepressing them to different pressures. In addition to these trialst two more trials were conducted using a magnetic field to align the particles in the graphite die in order to obtain better and more uniform particle packing. The parameters are tabulated in Table I.

These samples were analyzed to determine if there was any trend or relationship between fabrication conditions and the resulting density and mean pore size (MPS). A porosity of 50 to 60% with a mean pore size of 35 μm are desired.

Variations in the thickness of the plaques of 5–8 mils were observed. Generally, the samples were thinnest at the center and thickest at the edges. The variations in plaque thickness may be a source of density gradients within the samples.

TABLE I

| Sintering Variations or Anode Fabrication Trials | | |
|---|---|---|
| Sample Code | Sample ID | Sintering Conditions |
| 31 | 5NF140 | 0.2 w/o PVB in acetone; 250 psi (consolidation pressure; 126 g.load; gravity sintering. |
| 32 | 5NF140 | ($LiFeO_2$ with 0.5 w/o Elvacite) 250 psi consolidation pressure; 126 g.load; "pressureless" sintering |
| 33 | 5NF142 | vibratory packing in mag. field; 100 psi consolidation pressure; hot press T = 925° C., 1000 psi. |
| 34 | 5NF142 | vibratory packing in mag. field; 100 psi consolidation pressure; 126 g.load; pressureless sintering (T = 925° C.). |

A total of 11 different anode specimens were fabricated and the processing conditions are listed in Table II.

Fabrication Characteristics of Metal-coated $LiFeO_2$ Powders

Figure 6:
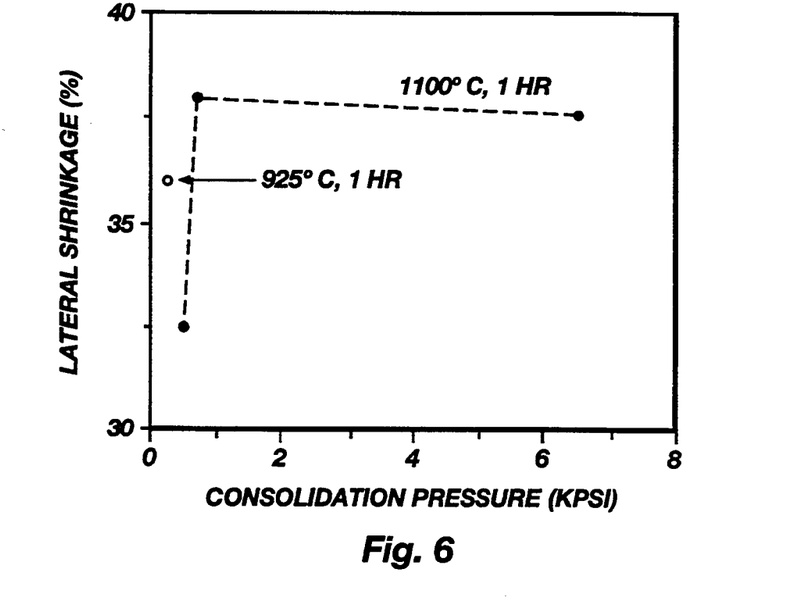
FIG. 6 is a graph which illustrates the effect of temperature on the shrinkage of $LiFeO_2$ anodes.
Figure 7:
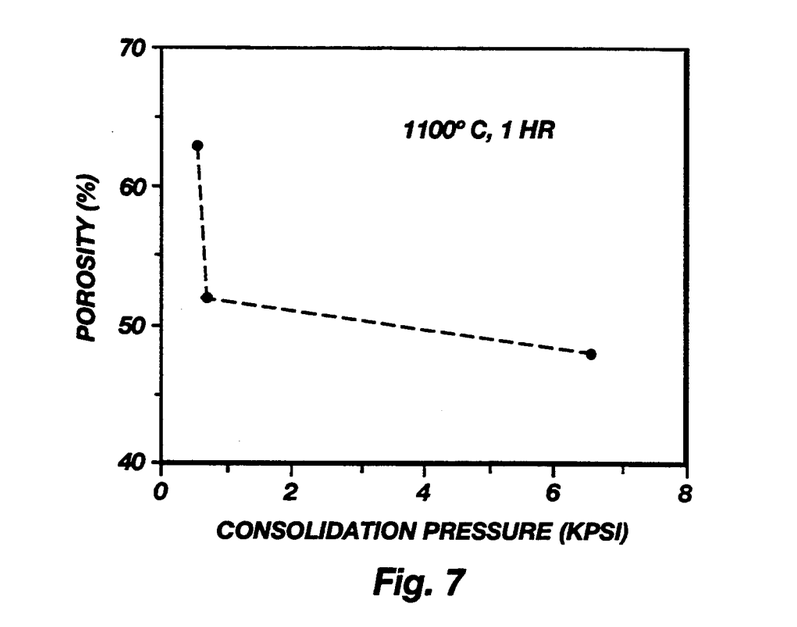
FIG. 7 is a graph which illustrates the effect of consolidation pressure on porosity of $LiFeO_2$ anodes.

Three anode fabrication trials were conducted to determine the shrinkage and porosity characteristics of metal-coated $LiFeO_2$ porous compacts. The shrinkage of the $LiFeO_2$ anodes is considerable as compared to the $LiAlO_2$ anodes. As shown in FIG. 6, the mean shrinkage upon firing at 925° C. for 1 hr is 36% for a consolidation pressure of about 150 psi. The porosity of these anodes varies from approximately 48 to 54%. For anodes made at different consolidation pressures and fired at 1100° C. for 1 hr, the shrinkage varies from about 32% for a consolidation pressure of about 440 psi to a high of about 38% at 6.6 Kpsi. The porosity variation, shown in FIG. 7, is as expected with the highest porosity being exhibited by the anode fabricated at the lowest consolidation pressure.

Fabrication of Metal-coated $LiFeO_2$ Tape Cast Anodes

Several anodes were fabricated by tape casting metal coated $LiFeO_2$ powder. The resultant tapes were thin and very fragile. Four tapes were pressed together at 10,000 psi. Several anodes 1" in diameter were punched from the plaque. The geometric densities (i.e., sample weight/sample volume) of the anodes were between 3.45 and 3.89 g/cc. A median pore size of 1.24 and a porosity of 46.4% was determined by the porosimetry of one of the anodes. The skeletal density obtained was 8.18 g/cc which may indicate that the powder used was composed primarily of Cu and Ni.

For the purpose of conducting the in-cell tests, it was necessary to fabricate the larger 4"×4" anodes for in-cell testing and evaluation. To this end, a large batch of $LiFeO_2$ powder was synthesized and metal coated. Metal-coated $LiAlO_2$ powder was used to cast a 8" wide tape. Three large green $LiAlO_2$ tape blanks were cut and tested in-cell.

TABLE II

Fabrication of Metal Coated LiFeO$_2$ Anodes

| Sample No | Processing Condition |
|---|---|
| 4-1 | 10 μm, LiFeO$_2$, 250 psi consolidation pressure, 126 g.dead load, T = 920° C.; 0.5 w/o binder. |
| 4-2 | same as above but with ~ 0.7 w/o binder. |
| 4-3 | 10 μm, LiFeO$_2$, 100 psi consolidation pressure, 126 g.dead load, T = 920° C. |
| 4-4 | same as 4-3 but with 250 psi consolidation pressure. |
| 4-5 | 10 μm, vibratory milled LiFeO$_2$. |
| 4-6 | 10 μm, ball milled LiFeO$_2$. |
| 4-7 | 10 μm, ball milled LiFeO$_2$, coated powder crushed lightly in a mortar before sintering to break up necks between particles. |
| 4-8 | 5 μm, ball milled LiFeO$_2$. |
| 4-9 | 1 μm, vibratory milled LiFeO$_2$. |
| 4-10 | sub-1 μm, vibratory milled LiFeO$_2$. |
| 4-11 | 1 μm, ball milled LiFeO$_2$, Samples |

4-5 thorough 4-11 were consolidated at 250 psi and sintered at 920° C. All of the above samples were sintered in a 90% argon-10% hydrogen atmosphere.

In order to span the region of possible temperature and compressive forces that a porous anode could encounter in an operating fuel cell, two temperatures (650° and 700° C.) and three holding forces (25, 50, and 100 psi) were used in earlier tests.

All of the tests which were completed are listed in Table III. Porosimetry was used to determine the volume percent porosity, mean pore size, and pore size distribution for each of the anode plaques tested. Initially, the target pore size range was 1–3 μm. The mean pore size of plaques tested initially were typically between 7–15 μm. Mean pore size of plaques were reduced in further experimentation and were mostly in the range of 4–10 μm. The state-of-the-art nickel-10% chrome anodes are about 65 vol. % porosity and an average pore size of 4–6 μm. The majority of the metal coated LiFeO$_2$ ceramic anodes had 45 to 55 vol. % porosity. In general, the metal coated anodes tested had larger pores and a smaller volume percent porosity than the state of the art nickel-chrome anodes.

TABLE III

| Batch No. | Test No. | Start | End Date | Rig No. | Test Conditioning | Plaque No. | Material | Powder | Load % | % Ni | % Cu | PPS | Porosity | % Creep |
|---|---|---|---|---|---|---|---|---|---|---|---|---|---|---|
| 8 | CACT-1 | 10/29/86 | 11/05/86 | 3 | 650 C. 100 PSI | SNF 138-B | LiFeO$_2$ | SNF 130-B | 50.00 | 25.00 | 25.00 | 18.20 | 56.80 | 26.85 |
| 5 | 2.3.lb-05 | 07/16/87 | 07/23/87 | 1 | 650 C. 100 PSI | XXXX V-1 | LiFeO$_2$ | LF-18 | 37.00 | 18.50 | 18.50 | 6.00 | 67.60 | 7.63 |
| 5 | 2.3.lb-05 | 07/16/87 | 07/23/87 | 1 | 650 C. 100 PSI | XXX V-2 | LiFeO$_2$ | LF-18 | 37.00 | 18.50 | 18.50 | 6.00 | 56.70 | 2.26 |
| 5 | 2.3.lb-05 | 07/16/87 | 07/23/87 | 1 | 650 C. 100 PSI | XXXX V-4 | LiFeO$_2$ | LF-18 | 37.00 | 18.50 | 18.50 | 6.00 | 63.90 | 8.82 |
| 5 | 2.3.lb-05 | 07/16/87 | 07/23/87 | 2 | 670 C. 100 PSI | XXXI-3 | LiFeO$_2$ | LF-7 | 62.67 | 31.23 | 31.23 | 6.00 | 67.50 | |
| 5 | 2.3.lb-05 | 07/16/87 | 07/23/87 | 2 | 650 C. 100 PSI | XXXI-4 | LiFeO$_2$ | LF-7 | 62.67 | 31.23 | 31.23 | 6.00 | 53.60 | 7.63 |
| 5 | 2.3.lb-05 | 07/16/87 | 07/23/87 | 3 | 650 C. 100 PSI | XXXXI X-1 | LiFeO$_2$ | LF-10 | 37.00 | 18.50 | 18.50 | 6.00 | 63.10 | 2.62 |
| 5 | 2.3.lb-05 | 07/16/87 | 07/23/87 | 3 | 650 C. 100 PSI | XXXXI X-2 | LiFeO$_2$ | LF-10 | 37.00 | 18.50 | 18.50 | 6.00 | 63.75 | .69 |
| 6 | 2.3.lb-06 | 07/24/87 | 08/08/87 | 2 | 650 C. 100 PSI | XXXX VIII-2 | LiFeO$_2$ | LF-10 | 37.00 | 18.50 | 18.50 | 6.00 | 44.10 | 2.55 |
| 6 | 2.3.lb-06 | 07/26/87 | 08/08/87 | 3 | 650 C. 100 PSI | XXXIII-2 | LiFeO$_2$ | LF-9 | 46.50 | 23.20 | 23.20 | 6.00 | 63.80 | |
| 10 | 2.3.lb-10 | 11/25/87 | 12/01/87 | 1 | 650 C. 100 PSI | LXXX XVI-1 | LiFeO$_2$ | LF-18 | 50.49 | 33.00 | 17.49 | 9.00 | 26.87 | |
| 10 | 2.3.lb-10 | 11/25/87 | 12/01/87 | 1 | 650 C. 100 PSI | LXXX XVI-2 | LiFeO$_2$ | LF-18 | 50.49 | 33.00 | 17.49 | 9.00 | 27.37 | |
| 10 | 2.3.lb-10 | 11/25/87 | 12/01/87 | 1 | 650 C. 100 PSI | LXXX XVI-3 | LiFeO$_2$ | LF-18 | 50.49 | 33.00 | 17.49 | 9.00 | 27.11 | |
| 10 | 2.3.lb-10 | 11/25/87 | 12/01/87 | 2 | 650 C. 100 PSI | LXXX XVII-1 | LiFeO$_2$ | LF-18 | 50.49 | 33.00 | 17.49 | 9.00 | 29.21 | |
| 10 | 2.3.lb-10 | 11/25/87 | 12/01/87 | 2 | 650 C. 100 PSI | LXXX XVII-2 | LiFeO$_2$ | LF-18 | 50.49 | 33.00 | 17.49 | 9.00 | 30.12 | |
| 10 | 2.3.lb-10 | 11/25/87 | 12/01/87 | 2 | 650 C. 100 PSI | LXXX XVII-3 | LiFeO$_2$ | LF-18 | 50.49 | 33.00 | 17.49 | 9.00 | 27.18 | |
| 11 | 2.3.lb-11 | 03/29/88 | 04/06/88 | 1 | 650 C. 100 PSI | 156-2 | LiFeO$_2$ | LF-19 | 63.66 | 21.66 | 21.66 | | 41.20 | |
| 11 | 2.3.lb-11 | 03/29/88 | 04/06/88 | 1 | 650 C. 100 PSI | 156-3 | LiFeO$_2$ | LF-19 | 63.66 | 21.66 | 21.66 | | 40.74 | |
| 11 | 2.3.lb-11 | 03/29/88 | 04/06/88 | 2 | 650 C. 100 PSI | 158-2 | LiFeO$_2$ | LF-16 | 66.00 | 33.00 | 33.00 | | 42.82 | |
| 11 | 2.3.lb-11 | 03/29/88 | 04/06/88 | 2 | 650 C. 100 PSI | 158-3 | LiFeO$_2$ | LF-16 | 66.00 | 33.00 | 33.00 | | 42.84 | |
| 11 | 2.3.lb-11 | 03/29/88 | 04/06/88 | 3 | 650 C. 100 PSI | 200-1 | LiFeO$_2$ | LF-16 | 66.00 | 33.00 | 33.00 | | 44.29 | |
| 11 | 2.3.lb-11 | 03/29/88 | 04/06/88 | 3 | 650 C. 100 PSI | 200-2 | LiFeO$_2$ | LF-16 | 66.00 | 33.00 | 33.00 | | 41.72 | |
| 11 | 2.3.lb-11 | 03/29/88 | 04/06/88 | 3 | 650 C. 100 PSI | 200-3 | LiFeO$_2$ | LF-16 | 66.00 | 33.00 | 33.00 | | 38.58 | |

Chemical analysis was performed to determine the metal-to-ceramic ratio of the anode materials. The anodes tested were coated with pure nickel or a nickel-copper alloy. The nickel-copper coatings were generally about 50 wt % each metal. The amount of metal in the samples or metal loading varied between 10 and 60 wt % (see Table III).

Figure 8A:
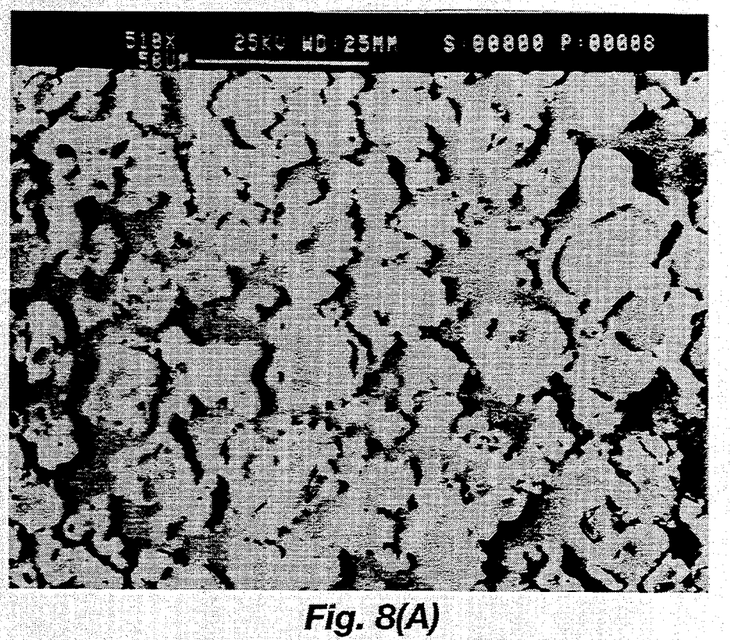
FIGS. 8(A) and 8(B) are photomicrographs of metal coated anodes.
Figure 8B:
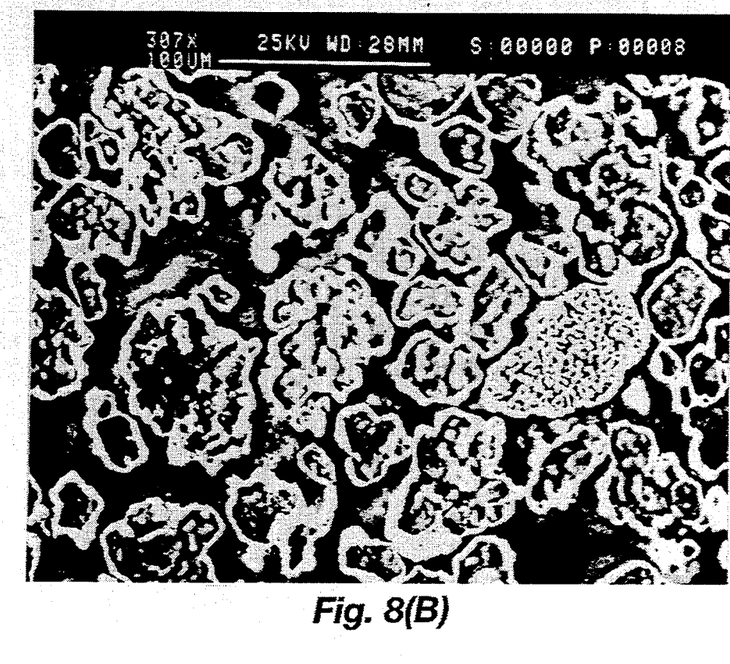

Scanning electron photomicrographs of polished cross-sections of the anode plaques before testing showed the quality of the materials produced was consistently improved. Photomicrographs showing an excellent microstructure are depicted in FIGS. 8(A) and 8(B).

IN-CELL TESTING

Figure 9:
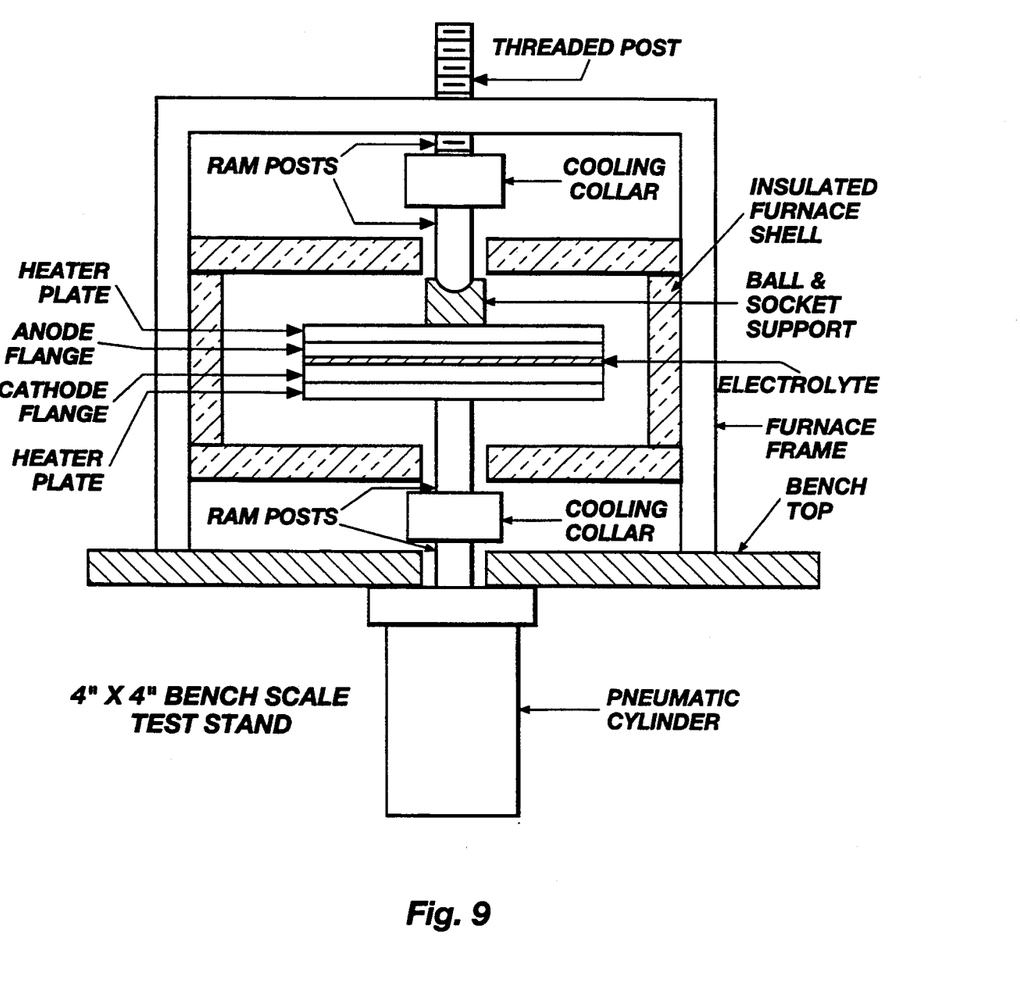
FIG. 9 is a diagram of a cell package test stand.

An in-cell test was made using standard boiler-plate hardware, a sintered $LiFeO_2$ anode, a SOA Ni cathode, stainless steel cathode current collector, and a Ni anode current collector were prepared for assembly. The cell package was assembled and then placed in the bench-scale test stand. A diagram of how the cell package is set up in the test stand is shown in FIG. 9.

Three nickel coated $LiAlO_2$ tapes and one nickel coated $LiFeO_2$ tape size large enough to test in bench-scale (94 $cm^2$) 54% metal loading were sintered and prepared for creep and bench-scale fuel cell tests. A $Ni/LiAlO_2$ tape and the $Ni/LiFeO_2$ tape were sintered in a standard muffle furnace, also purged with cracked ammonia gas. The heating schedule followed was:
  4 hours ramped to 850° C.
  1 hour ramp to 950° C.
  15 minute hold at 950° C.
  Cool.

A $LiFeO_2$ electrode which had 54% metal loading, a thickness from 0.0233 inch to 0.0064 inch, was tested. The cell package was assembled using a state-of-the-art (SOA) nickel cathode and hot-pressed tile. The test was begun using a normal slow ramp heat-up (room temperature to 350° C. in 3 hours, from 350° C. to 650° C. in 18 hours). The initial cell performance was poor compared to a SOA cell; it would not hold a stable voltage at 140 $mA/cm^2$ load, and the resistance was somewhat high at 7.68 m$\Omega$. Increases in the cell holding force which was at 10 psi initially were applied at 24 (15 psi), 143 (20 psi), 167 (25 psi), 191 (30 psi), and 239 (35 psi) hours. The reason for increasing the holding force was to attempt to improve the contact of the anode to the tile in case the resistance, and poor performance, were due to poor surface contact between the anode and electrolyte. (The poor contact may have been due to the thickness variation of the electrode.) A table showing the cell performance mV, IR-free mV, and polarization mV is shown in Table IV.

TABLE IV

| Hours-) | 0 | 24 | 48 | 72 | 144 | 168 | 192 | 216 | 312 | 336 | 360 |
|---|---|---|---|---|---|---|---|---|---|---|---|
| $mA/cm^2$ | Cell millivolts | | | | | | | | | | |
| 0(OCV) | 992 | 988 | 986 | 987 | 991 | 990 | 989 | 994 | 989 | 989 | 987 |
| 40 | 876 | 877 | 871 | 853 | 811 | 841 | 837 | 847 | 843 | 845 | 843 |
| 60 | 812 | 823 | 806 | 790 | 737 | 775 | 774 | 779 | 774 | 778 | 784 |
| 80 | 733 | 770 | 744 | 721 | 653 | 698 | 688 | 708 | 694 | 704 | 703 |
| 100 | 660 | 707 | 675 | 644 | 547 | 617 | 610 | 625 | 613 | 630 | 619 |
| 120 | 577 | 645 | 606 | 572 | 455 | 540 | 529 | 548 | 540 | 548 | 555 |
| 140 | 498 | 576 | 531 | 491 | 363 | 463 | 454 | 475 | 467 | 483 | 483 |
| 160 | | 510 | 462 | 416 | 273 | 387 | 381 | 406 | 396 | 417 | 424 |
| 180 | | 432 | 367 | 330 | | 314 | 308 | 326 | 336 | 356 | 351 |
| 200 | | | | | | | | | 266 | 284 | |
| 220 | | | | | | | | | | | |
| 240 | | | | | | | | | | | |
| resistance | 7.68 | 7.85 | 8.96 | 10 | 10.2 | 10.7 | 9.75 | 9.9 | 7.96 | 7.8 | 7.89 |
| $mA/cm^2$ | IR free millivolts | | | | | | | | | | |
| 40 | 907 | 908 | 907 | 893 | 852 | 884 | 876 | 887 | 875 | 876 | 875 |
| 60 | 858 | 870 | 860 | 850 | 798 | 839 | 833 | 838 | 822 | 825 | 831 |
| 80 | 794 | 833 | 816 | 801 | 735 | 784 | 766 | 787 | 758 | 766 | 766 |
| 100 | 737 | 786 | 765 | 744 | 649 | 724 | 708 | 724 | 693 | 708 | 698 |
| 120 | 669 | 739 | 714 | 692 | 577 | 668 | 646 | 667 | 636 | 642 | 650 |
| 140 | 606 | 686 | 656 | 631 | 506 | 613 | 591 | 614 | 578 | 592 | 593 |
| 160 | | 636 | 605 | 576 | 436 | 558 | 537 | 564 | 523 | 542 | 550 |
| 180 | | 573 | 528 | 510 | | 507 | 484 | 504 | 479 | 496 | 493 |
| 200 | | | | | | | | | 409 | 424 | |
| 220 | | | | | | | | | | | |
| 240 | | | | | | | | | | | |
| mA/cm2 | Polarization millivolts | | | | | | | | | | |
| 40 | 85 | 80 | 79 | 94 | 139 | 106 | 113 | 107 | 114 | 113 | 112 |
| 60 | 134 | 118 | 126 | 137 | 193 | 151 | 157 | 156 | 167 | 164 | 156 |
| 80 | 198 | 155 | 170 | 186 | 256 | 206 | 223 | 207 | 231 | 223 | 221 |
| 100 | 255 | 203 | 221 | 243 | 342 | 266 | 282 | 270 | 296 | 281 | 289 |
| 120 | 323 | 249 | 272 | 295 | 414 | 322 | 343 | 327 | 353 | 347 | 337 |
| 140 | 386 | 302 | 330 | 356 | 485 | 377 | 399 | 380 | 411 | 397 | 394 |
| 160 | | 352 | 381 | 411 | 555 | 432 | 452 | 430 | 466 | 447 | 437 |
| 180 | | 415 | 458 | 477 | | 483 | 506 | 490 | 510 | 493 | 494 |
| 200 | | | | | | | | | 580 | 565 | |
| 220 | | | | | | | | | | | |
| 240 | | | | | | | | | | | |

IR FREE mV = mV at load plus resistance in milli-ohms times amps at load setting i.e. 7.68 milli-ohms times (100 cm2 × 160 $mA/cm^2$ = 16000 mA)/1000 = 122.88 mV
Polarization voltage equals OCV millivolts minus IR free millivolts The cell was terminated after 360 hours of cell life, since little improvement was observed after the last cell holding force increase. The terminated anode and current collector were measured and compared to the pre-test anode measurements. Allowing for the thickness of the current collector, which was subtracted from the total measurement since it could not be separated from the anode, the change in anode thickness from pre-test to post-test was 2.6 mils. This change, based on the pre-test thickness of 19.7 mils, corresponds to a 13.2% creep value for the anode.

TABLE V

Comparison of IR Loss, IR-Free, and Polarization
Cell Test CerLiFe-1
Load Voltage, mV

| Date | Hours | OCV | mV at 100 mA/cm² | mV at 160 mA/cm² | IR-Loss @ 160 mA | IR-Free @ 160 mA | RES. mΩ | Polarization @ 160 mV/cm² |
|---|---|---|---|---|---|---|---|---|
| 1988 | | | | | | | | |
| 4/12 | 0 | 992 | 660 | N/A | 123 | N/A | 7.7 | N/A |
| 4/13 | 24 | 988 | 707 | 510 | 125 | 635 | 7.8 | 353 |
| 4/14 | 48 | 986 | 675 | 462 | 142 | 604 | 8.9 | 382 |
| 4/15 | 72 | 987 | 644 | 416 | 160 | 576 | 10.0 | 411 |
| 4/18 | 144 | 991 | 547 | 273 | 163 | 436 | 10.2 | 555 |
| 4/19 | 168 | 990 | 617 | 387 | 171 | 558 | 10.7 | 432 |
| 4/20 | 192 | 989 | 610 | 381 | 155 | 536 | 9.7 | 453 |
| 4/21 | 216 | 994 | 625 | 406 | 158 | 564 | 9.9 | 430 |
| 4/22 | 240 | 991 | 621 | 394 | 139 | 533 | 8.7 | 458 |
| 4/25 | 312 | 989 | 613 | 396 | 127 | 523 | 7.96 | 466 |
| 4/26 | 336 | 989 | 630 | 417 | 125 | 542 | 7.8 | 447 |
| 4/27 | 360 | 987 | 619 | 424 | 126 | 550 | 7.89 | 437 |
| Data from a normal SOA fuel cell with Ni + Cr Anode (Cell Test IGT-83-5AC): | | | | | | | | |
| | 192 | 991 | 847 | 758 | 85 | 843 | 5.32 | 148 |

As can be seen from Table V, the performance of this cell was inferior to SOA performance. From Table IV it can be seen that the OCV of the cell was acceptable indicating the proper electrochemical potentials each side of the cell (no gas crossover). This was corroborated by measuring the gas crossover during cell life. However, looking at the cell potential at 160 mA/cm² and 192 hours, it can be seen that it is about 377 mV (758–381) lower than a SOA cell whose test results are depicted at the bottom of Table V (just the first 360 hours of a 528 hour test are shown for comparison). This 377 mV lower performance is made up from 70 mV higher IR (155-85) and 305 mV higher polarization loss (453-148). That is, most of the observed lower performance is due to polarization losses which are most likely due to the active three phase contact on this metal coated LiFeO₂ anode not being optimized in this first test. This factor is encouraging since the particle size and the electrode morphology can be developed to more closely match that of a SOA electrode.

The pre-test sample was analyzed for Ni, Cu, Fe and Li by atomic absorption of a completely dissolved anode solution. The percentages of Fe and Li in the samples were converted to percentages of Fe₂O₃ and Li₂O, which may be combined to represent LiFeO₂ or Li$_x$FeO₂ in case of non-stoichiometry.

TABLE VI

| Components | Chemical Analysis Pre-test | Post-test |
|---|---|---|
| Cu | 40.84 | 35.63 |
| Ni | 25.60 | 22.32 |
| Li | 1.20 | 1.88 |
| Fe | 26.61 | 20.50 |
| K | — | 2.23 |
| CO₂ | — | 3.40 |
| Li₂O | 2.57 | 3.72 |
| Fe₂O₃ | 38.04 | 29.34 |
| K₂CO₃ | | 3.94 |
| Li₂CO₃ | | 0.75 |
| Li₂:Fe₂O₃ (by mole) | 0.36 | 0.68 |
| Cu:Ni (by weight) | 1.60 | 1.60 |
| Metal:Fe₂O₃ (by weight) | 1.75 | 1.98 |

Results of chemical analysis of pre- and post-test anode are presented in Table VI. The pre-test sample consisted of Cu, Ni and LiFeO₂. The Li-to-Fe atom ratio was 0.36, indicating a Li-deficient lithium iron oxide compound which can be represented as $(Li_2O)_x \cdot Fe_2O_3$ with x=0.36.

The post-test anode contained Li₂CO₃ and K₂CO₃. To breakdown the total Li to those tied up to $(Li_2O)_x \cdot Fe_2O_3$ and Li₂OCO₃, CO₂ analysis was performed. Thus, it was assumed that K was converted to K₂CO₃ and CO₂ in excess of that tied up to K was combined with Li to form Li₂CO₃. Excess Li not tied up with CO₂ was then assumed to be tied up with Fe in the form of $(Li_2O)_x Fe_2O_3$. The results yield an x=0.68 post-test. Therefore, lithiation of the anode took place during cell operation. This is not surprising since one would expect the stoichiometric Li₂O.Fe₂O₃ to be stable phase in the presence of electrolyte. In fact, one should start with a stoichiometric LiFeO₂ material to prevent lithium consumption from the electrolyte.

The Cu/Ni ratio was similar for both pre- and post-test samples as expected for a sample coated under controlled conditions.

The metal-to-Fe₂O₃ ratio was 1.75 pre-test and 1.98 post-test suggesting slight non-uniformity in metal loading throughout the sample.

The carbonate content of the post-test anode was only 4.69% by weight or 25% filling of the 41% anode porosity. This carbonate content is generally acceptable.

An important observation is the obvious improvement in metal coating coverage on LiFeO₂ substrates. This is attributed to the stability of the substrate in the plating bath. It is clear that substrate-bath interactions play an important role, not only in ensuring good unflocculated powder dispersions, but also in ensuring uniformity of surface sensitization and activation procedures.

Creep Behavior of Metal-coated LiFeO₂ Anodes

Figure 10:
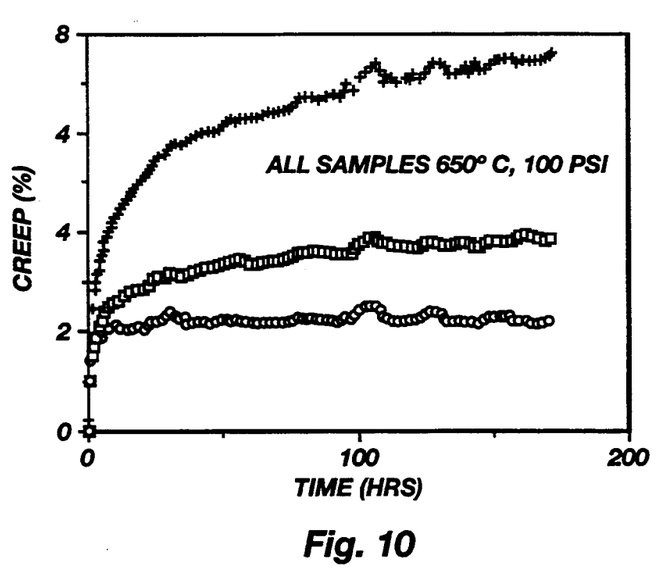
FIG. 10 is a graph depicting the creep characteristics of $LiFeO_2$ material.

In the case of LiFeO₂ anodes, the major difference is that the metal wetting characteristics are more favorable. Thus a better bond is to be expected between the metal and the ceramic, reducing the amount of primary creep. FIG. 10 shows the general trends in the creep behavior of metal-coated LiFeO₂ anodes. Creep is relatively insensitive to both metal loading and anode porosity, indicative that once particle rearrangement occurs secondary creep mechanism dominates the creep behavior. Creep characteristics are shown for Test #2.3.lb-5. The data show that the magnitude of the primary creep is less than ~2%. Further creep is as expected for diffusion driven process. The data for rig 2 for anodes with higher metal loading are inconsistent with the trend and should be disregarded due to a malfunctioning test rig. The effect of anode morphology is greater, with higher anode creep exhibited for anodes with greater mean pore size and porosity. This is consistent with observations of $LiAlO_2$ anodes.

Conclusions

In summary, the following points emerge from the analysis of the microstructure/creep measurements relations.
1. For any metal-coated ceramic anodes, the predominant creep mechanism is due to particle rearrangement. This mechanism will dominate creep behavior even if the metal wets the ceramic but does not adhere well.
2. The anode porosity must be as low as possible consistent with anode performance criteria such as polarization phenomena associated with mass transport limitations in such porous electrodes. The mean pore size must also be as low as possible, consistent with performance criteria.
3. Metal coated anodes will exhibit lower creed at lower metal loadings. In fact, the data suggest that completeness of coverage is not the important criterion. Rather, uniformity of metal deposition is more important. It is conceivable that if the metal deposits adhere well, then in a three dimensional porous structure there can be contiguity of metal contacts leading to anode conductivity,
4. The factors affecting metal coating coverage have been mentioned earlier. One consideration is the deposition of metal alloys. In any process which deposits metals sequentially, the driving force for alloy formation will generally exceed the force for wetting (and hence adhesion) on the ceramic. This could also lead to some Kirkendall porosity at the metal/ceramic interface. These factors will weaken the bond and thus lead to poor mechanical properties. Thus there may be advantage in deposition of alloys on the surface.

What is claimed is:
1. A creep-resistant electrolyte/electrode structure for a high-temperature fuel cell comprising:
  an ion conducting electrolyte;
  a layer of unsintered particulate single phase alpha-$LiFeO_2$ adjacent said electrolyte, said layer of unsintered particulate single phase alpha-$LiFeO_2$ being coated with a continuous film comprising a conductive metal powder, the metal thereof selected from the group consisting of nickel, copper, electrically conductive nickel alloys, and nickel-copper alloys, the metal powder and particulate $LiFeO_2$ being sinterable to a porous, electro-conductive creep-resistant electrode in electro-conductive contact with said electrolyte.
2. A creep-resistant electrode composition of an MCFC comprising an electro-conductive sintered metal coated single phase alpha-$LiFeO_2$ particulate structure having a porosity of about 30 to about 50%.
3. The creep-resistant electrolyte/electrode structure of claim 1 wherein said unsintered particulate $LiFeO_2$ has a particle size of between about 5 $\mu$m and about 8 $\mu$m,
4. The creep-resistant electrolyte/electrode structure of claim 1 wherein the metal is selected from the group consisting of nickel and electrically conductive nickel alloys.
5. The creep-resistant electrolyte/electrode structure of claim 1 wherein said metal alloy is a Ni/Cu alloy.
6. The creep-resistant electrolyte/electrode structure of claim 1 wherein said metal loading is from about 30% to about 60%.
7. The creep-resistant electrolyte/electrode structure of claim 1 wherein said metal powder is applied to said particulate $LiFeO_2$ by electroless deposition or chemical vapor deposition.
8. The creep-resistant electrolyte/electrode structure of claim 1 wherein said metal coated $LiFeO_2$, electrode has a thickness of from about 0.5 $\mu$m to about 1 $\mu$m.
9. The creep-resistant electrolyte/electrode structure of claim 6 wherein said metal loading is less than 40%.
10. The creep-resistant electrolyte/electrode structure of claim 5 wherein said Ni/Cu alloy is about 40 mol % to 60 mol % Ni.
11. The creep-resistant electrolyte/electrode structure of claim 1 wherein said $LiFeO_2$ has a chemical vapor deposition coating of metal thereon.
12. The creep-resistant electrolyte/electrode structure of claim 1 wherein said fuel cell is a molten carbonate fuel cell and said electrolyte is a carbonate ion conducting electrolyte.
13. The creep-resistant electrolyte/electrode structure of claim 1 wherein said fuel cell is a solid oxide fuel cell and said electrolyte is an oxygen ion conducting metal oxide electrolyte.
14. A molten carbonate fuel cell comprising:
  a molten carbonate electrolyte; and
  an electroconductive sintered metal coated single phase alpha-$LiFeO_2$ porous electrode, said metal selected from the group consisting of nickel, copper, electrically conductive nickel alloys, and nickel-copper alloys.

* * * * *